United States Patent
Wen et al.

(10) Patent No.: US 9,374,260 B2
(45) Date of Patent: Jun. 21, 2016

(54) METHOD AND APPARATUS FOR DIRECTLY DETECTED OPTICAL TRANSMISSION SYSTEMS BASED ON CARRIERLESS AMPLITUDE-PHASE MODULATION

(71) Applicant: Futurewei Technologies, Inc., Plano, TX (US)

(72) Inventors: Yangjing Wen, Cupertino, CA (US); Xiao Shen, San Bruno, CA (US); Yusheng Bai, Los Altos Hills, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 267 days.

(21) Appl. No.: 14/074,556

(22) Filed: Nov. 7, 2013

(65) Prior Publication Data

US 2015/0125160 A1   May 7, 2015

(51) Int. Cl.
| | |
|---|---|
| *H04B 10/04* | (2006.01) |
| *H04B 10/12* | (2006.01) |
| *H04J 4/00* | (2006.01) |
| *H04J 14/02* | (2006.01) |
| *H04L 27/36* | (2006.01) |
| *H04L 27/38* | (2006.01) |

(Continued)

(52) U.S. Cl.
CPC ............ *H04L 27/36* (2013.01); *H04L 25/4921* (2013.01); *H04L 27/2626* (2013.01); *H04L 27/2647* (2013.01); *H04L 27/2697* (2013.01); *H04L 27/38* (2013.01); *H04L 27/2618* (2013.01)

(58) Field of Classification Search
CPC ....... H04B 10/516; H04B 10/54; H04J 14/08; H04L 27/36; H04L 27/38; H04L 25/4921; H04L 27/2626; H04L 27/2647; H04L 27/2697; H04L 27/2618
USPC .............. 398/185, 76–79, 184, 81, 115, 203; 372/50.124

See application file for complete search history.

(56) References Cited

U.S. PATENT DOCUMENTS

| 5,930,309 A | * | 7/1999 | Knutson | ............. H04L 25/4921 370/342 |
| 5,987,073 A | * | 11/1999 | Knutson | ............... H04L 7/0334 329/304 |

(Continued)

FOREIGN PATENT DOCUMENTS

| CN | 1394005 A | 1/2003 |
| CN | 101369850 A | 2/2009 |

(Continued)

OTHER PUBLICATIONS

PCT Internaltional Search Report Dated Jan. 15, 2015.

*Primary Examiner* — Ken N Vanderpuye
*Assistant Examiner* — Abbas H Alagheband
(74) *Attorney, Agent, or Firm* — Vierra Magen Marcus LLP (57) ABSTRACT

Methods and apparatus for directly detected optical system based on gapped CAP modulation and DSP Methods for generation and reconstruction of gapped CAP signal are disclosed. An apparatus for direct detection transmission for CAP modulated signal with two unbalanced optical sidebands separated by gaps is disclosed, in which a gapped CAP signal is generated, converted, and passed to an optical filter for unbalanced sidebands generation and wavelength locking before being transmitted over an optical link. Direct detection is performed on the optical signal and passed to gapped matching filters. Channel equalization is performed and the signal information is decoded to binary data.

18 Claims, 7 Drawing Sheets

(51) Int. Cl.
*H04L 25/49* (2006.01)
*H04L 27/26* (2006.01)

(56) References Cited

U.S. PATENT DOCUMENTS

| | | | | |
|---|---|---|---|---|
| 5,991,336 A * | 11/1999 | Scholtz | ............... | H04L 25/4921 332/103 |
| 6,031,431 A * | 2/2000 | Vinekar | ............ | H04L 25/03834 332/103 |
| 6,101,217 A * | 8/2000 | Gut | ................... | H04L 25/03057 329/304 |
| 6,141,386 A * | 10/2000 | Termerinac | ........ | H03H 17/0288 375/259 |
| 6,507,391 B2 * | 1/2003 | Riley | ................. | G01N 15/1012 356/28 |
| 6,532,061 B2 * | 3/2003 | Ortyn | ................. | G01N 15/1012 356/28 |
| 6,771,690 B2 * | 8/2004 | Heikkila | ........... | H04B 1/71052 370/335 |
| 6,804,267 B1 * | 10/2004 | Long | ....................... | H04L 5/023 370/286 |
| 7,146,103 B2 * | 12/2006 | Yee | .................... | H04B 10/2507 398/152 |
| 7,774,395 B2 * | 8/2010 | Wagner | .............. | H03H 17/0225 708/319 |
| 7,885,350 B1 * | 2/2011 | Eidson | ................ | H04L 27/2607 375/295 |
| 8,111,993 B2 * | 2/2012 | Lowery | .............. | H04B 10/2513 398/147 |
| 8,112,001 B2 * | 2/2012 | Lowery | .............. | H04B 10/2543 398/158 |
| 8,484,272 B2 * | 7/2013 | Gore | ..................... | H04L 5/0044 370/208 |
| 8,693,876 B2 * | 4/2014 | Krause | ............... | H04B 10/5055 398/115 |
| 8,768,175 B2 * | 7/2014 | Djordjevic | ........... | H04B 10/548 398/152 |
| 9,130,678 B2 * | 9/2015 | Krause | ............... | H04B 10/5055 |
| 9,282,557 B2 * | 3/2016 | Gao | ...................... | H04J 3/0641 |
| 2002/0093641 A1 * | 7/2002 | Ortyn | ................. | G01N 15/1012 356/28 |
| 2002/0122167 A1 * | 9/2002 | Riley | ................. | G01N 15/1012 356/28.5 |
| 2002/0181602 A1 * | 12/2002 | Reddy | ................. | H04L 25/4921 375/261 |
| 2002/0196507 A1 * | 12/2002 | Stuart | ................ | H04B 10/2513 398/178 |
| 2003/0063659 A1 * | 4/2003 | Kaltiainen | .............. | H04L 1/243 375/222 |
| 2004/0190641 A1 * | 9/2004 | Ojard | ........................ | H04L 1/04 375/261 |
| 2005/0047513 A1 * | 3/2005 | Vitenberg | ........... | H04L 27/0004 375/260 |
| 2005/0207510 A1 * | 9/2005 | Ojard | ........................ | H04L 1/04 375/299 |
| 2006/0291503 A1 * | 12/2006 | Chapman | .......... | H04L 25/03993 370/469 |
| 2008/0075472 A1 * | 3/2008 | Liu | ............................... | 398/202 |
| 2010/0166427 A1 | 7/2010 | Jeong | | |
| 2010/0247099 A1 * | 9/2010 | Lowery | .............. | H04B 10/2543 398/79 |
| 2010/0329680 A1 * | 12/2010 | Presi | ................... | H04B 10/2587 398/79 |
| 2011/0075747 A1 * | 3/2011 | Mihota | ................ | H04B 7/0413 375/260 |
| 2011/0122912 A1 * | 5/2011 | Benjamin | ............ | H01S 5/4006 372/50.124 |
| 2013/0108271 A1 * | 5/2013 | Tang | ..................... | H04L 7/0008 398/66 |
| 2014/0056375 A1 * | 2/2014 | Mihota | .................... | H04B 7/04 375/267 |
| 2014/0072307 A1 * | 3/2014 | Zamani | ................ | H04B 10/616 398/79 |
| 2014/0199073 A1 * | 7/2014 | Yu | ......................... | H04L 5/0048 398/76 |

FOREIGN PATENT DOCUMENTS

CN 101465692 A 6/2009
CN 102340425 A 1/2012

* cited by examiner

System 112

METHOD AND APPARATUS FOR DIRECTLY DETECTED OPTICAL TRANSMISSION SYSTEMS BASED ON CARRIERLESS AMPLITUDE-PHASE MODULATION

FIELD

The present invention generally relates to the field of optical transmission systems. More specifically, the present invention related to providing a directly detected optical transmission system based on carrierless amplitude/phase modulation.

BACKGROUND

As the symbol rate continuously increases to meet the rising demand for bandwidth, optical transmission systems become more susceptible to link impairments, particularly fiber chromatic dispersion. Fiber dispersion effect can be compensated in optical domain using dispersion compensation fiber. However, this method introduces additional cost as well as link loss, which induces degraded optical signal to noise ratio (OSNR). The use of coherent detection retains the phase information of optical signal, therefore making the dispersion compensation feasible in the electrical domain. Coherent detection is not necessarily a cost-effective solution due to the requirement of hybrid mixer and local oscillator and is more suitably used in long-haul transport network. Self-coherent detection with interferometric field reconstruction can retrieve the complex-valued optical field (amplitude and phase) by digitally processing delay interferometer (DI) measurements, therefore realize a differential direct detection receiver with capabilities similar to a fully coherent receiver, without requiring a local oscillator laser in the receiver. This scheme requires delay interferometers and adds additional costs.

SUMMARY

Methods and apparatus for directly detected optical system based on gapped CAP modulation and DSP Methods for generation and reconstruction of gapped CAP signal are disclosed. An apparatus for direct detection transmission for CAP modulated signal with two unbalanced optical sidebands separated by gaps is disclosed, in which a gapped CAP signal is generated, converted, and passed to an optical filter for unbalanced sidebands generation and wavelength locking before being transmitted over an optical link. Direct detection is performed on the optical signal and passed to gapped matching filters. Channel equalization is performed and the signal information is decoded to binary data.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 2) describing the operations of this method, such steps and sequencing are exemplary. Embodiments are well suited to performing various other steps or variations of the steps recited in the flowchart of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
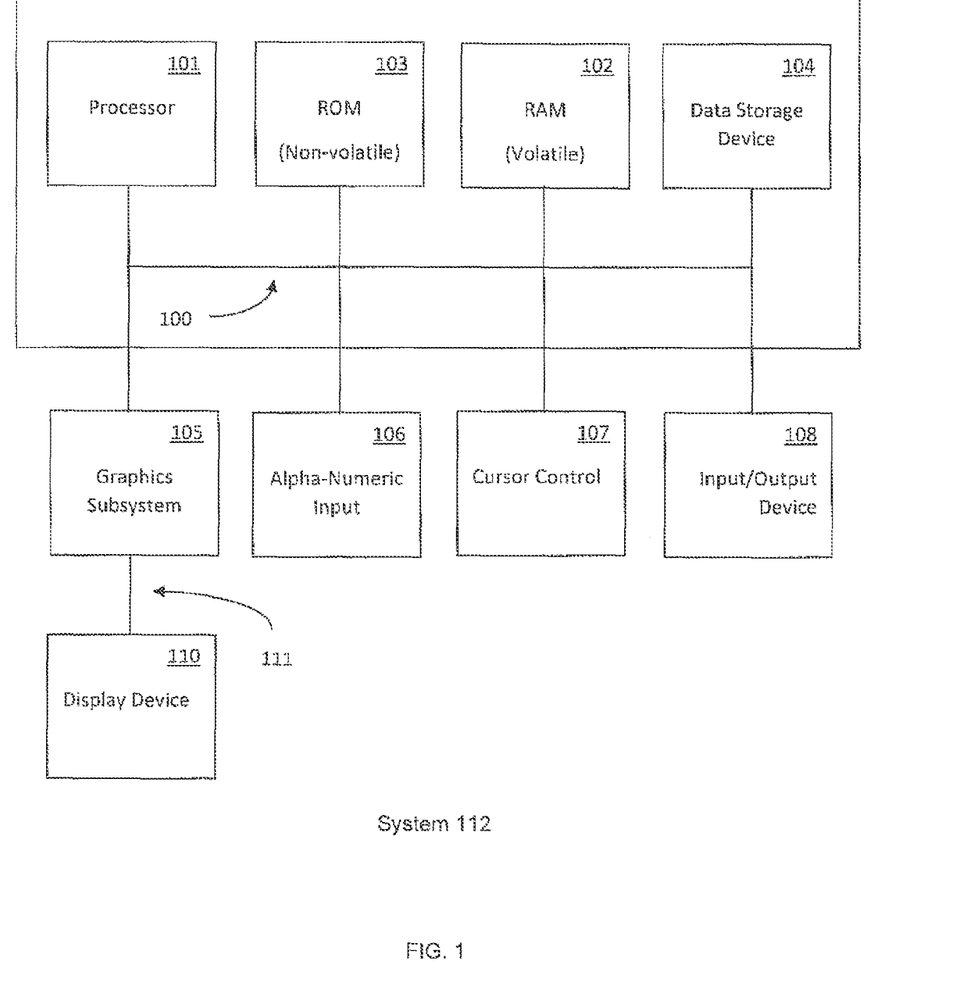
FIG. 1 is a block diagram of an exemplary computer system upon which embodiments of the present invention may be implemented.

Computing devices, such as computing system 112 depicted in FIG. 1, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Directly Detected Optical Transmission Systems Based on Carrierless Amplitude-Phase Modulation In the following embodiments, an approach is described providing a directly detected optical transmission system based on carrierless amplitude-phase modulation. This approach receives binary data as input, converts the binary data to a gapped CAP signal, convert the gapped CAP signal to an analogue signal for driving a laser, outputting an optical signal from the laser and receiving the optical signal at an optical filter. The optical filter generates two unbalanced optical sidebands separated by a gap and locks the wavelength of the optical signal. A direct detection module performs photodetection on the optical signal to generate an analogue signal and converts the analogue signal to a digital signal. A data reconstruction module processes the digital signal and decodes the signal information into binary data.

Recently electronic dispersion compensation using single-sideband (SSB) with optical carrier has been proposed using direct detection for baseband modulation, in which the signal is self-homodyned to baseband through the square-law detection process, and the optical phase information of the transmitted signal is translated directly into electrical phase information and preserved. For baseband modulation, the optical carrier to signal power ratio (OCSPR) should be very large to avoid the signal-signal beating induced interference. In this case, the power is mostly contained in optical carrier, which makes the system power inefficient and exhibits high minimum required OSNR (ROSNR).

Optical SSB has also been used in radio-over-fiber systems with radio frequency (RF) subcarrier modulated onto optical carrier. In this case, the spacing of the information sidebands on either side of the carrier is very large and the data rate carried over subcarrier is much lower than that of the radio frequency. It has also been proposed that a number of subcarriers are multiplexed within the transmitted signal optical single sideband. Because each subcarrier may have a significantly narrower bandwidth than the overall bandwidth of the transmitted optical signal, the subcarrier multiplexed system exhibits large dispersion tolerance and dispersion compensation is not required. To properly demultiplex the sub-carriers at receiver, these subcarriers should be positioned with sufficiently large spacing, leading to the relatively poor spectral efficiency. To improve the spectral efficiency of subcarrier multiplexed system, optical orthogonal frequency division multiplexing (OFDM) has been introduced. To further improve the comparatively poor optical power efficiency of subcarrier multiplexed system, a gap is introduced between the direct component (DC) and the OFDM signal.

Optical OFDM with SSB and gaps is expected to be dispersion tolerant with relatively high power efficiency. However, OFDM suffers from an intrinsic drawback, high peak to average power ratio (PAPR), which makes it more susceptible to nonlinearity, which may arise from fiber, driver, modulator, directly modulated laser, or transimpedance amplifier (TIA). For intensity modulation, high PAPR would also lead to high ROSNR. To reduce PAPR, single subcarrier is desirable in which the symbol rate is comparable to subcarrier frequency.

An optical transmitter which has an optical carrier and two unbalanced optical sidebands separated by gaps is disclosed, where the gap is introduced in the electrical domain via subcarrier modulation. More specifically, carrierless amplitude/phase (CAP) modulation, which is single subcarrier modulation with pass-band pulse shaping, is expected to have lower PAPR than that of OFDM. The symbol rate of the CAP signal is comparable with subcarrier frequency and the dispersion effect arising from the signal band itself matters. In addition, the unbalanced optical sideband generation realized by intensity modulation plus optical filtering may experience impairment from strong optical filtering. It is desirable to compensate these impairments in digital signal processing (DSP) rather than in optical domain.

Figure 2:
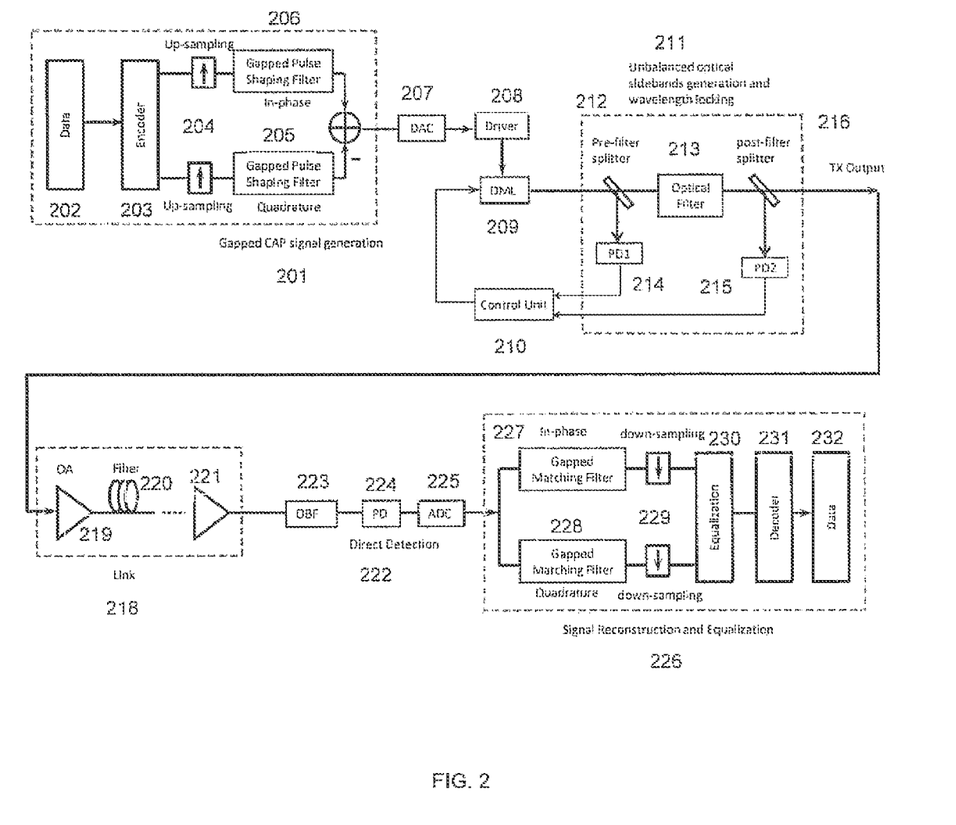
FIG. 2 is a diagram illustrating an exemplary direct detection transmission system based on gapped CAP modulation.

The gapped CAP modulation based direct detection system disclosed herein includes DSP generation of gapped CAP signal 201, optical transmitter with unbalanced optical sideband generation 211, optical link 218, direct detection 222, and signal reconstruction and equalization 226, as shown in FIG. 2.

To generate gapped CAP signal in DSP 201, a train of binary data 202 is fed into an encoder or mapper 203, which is first I/Q separated and each dimension is then (grey) mapped to generate multi-level format, like PAM-4 (pulse amplitude modulation). The encoded in-phase sequence is up-sampled at up-sampling module 204 and sent into a gapped in-phase pulse shaping filter 206, while the encoded quadrature sequence is fed into a gapped quadrature pulse shaping filter 205 after up-sampling at up-sampling module 204.

The impulse response of gapped in-phase shaping filter may have the form of $$h(t)=g(t)\cdot\cos(2\pi f_{sc}t) \quad (1)$$

And the impulse response of gapped quadrature shaping filter may have the form of $$\tilde{h}(t)=g(t)\cdot\sin(2\pi f_{sc}t) \quad (2)$$

Here $f_{sc}$ is signal center frequency or subcarrier frequency, which can be adjusted to introduce a desirable gap between the DC and signal, and g(t) is the baseband pulse shaping filter response. Here we are particularly interested in a relatively large $f_{sc}$, which generates a gap close to the signal bandwidth. The two impulse responses in equation (1) and (2) form a so-called Hilbert pair, in which their Fourier transforms have the same amplitude characteristics and phase characteristics that differ by 90 degree. Examples of impulse responses include raised-cosine and square root raised-cosine shaping filters. The outputs of the pulse shaping filters are subtracted to generate gapped CAP signal. If the multi-level format in each dimension is PAM-4, the resulting gapped CAP signal is CAP-16. CAP signal generation may also be realized with some modifications according to some embodiments. For example, the data may be first encoded (mapped) and up-sampled, then I/Q separated without deviating from the scope of the present invention.

The DSP generated CAP signal is then fed into a digital-to-analogue convertor (DAC) 207 to form the driving signal, which is used to drive a directly modulated laser (DML) 209 after being amplified by a driver or electrical amplifier 208. The DML 209 may be a distributed feedback (DFB) laser or a vertical cavity surface emitting laser (VCSEL), which is properly biased in considering the transient chirping, extinction ratio and modulation bandwidth. The output of the DML is sent into an optical filter 213 for unbalanced optical sidebands generation, where the filter is also used as part of wavelength locker for wavelength locking. A pre-filter splitter 212 and a post-filter splitter 216 are placed before and after the optical filter, respectively. Photo-detector 214 and photo-detector 215 are coupled to the pre-filter splitter and post-filter splitter, where the first photo-detector 214 and the second photo-detector 215 optical-electrically convert the signals before and after optical filter 213, respectively. The outputs of the two photo-detectors are sent to a control unit 210 in which they may be analogue-to-digital (A/D) converted, processed, and converted back to analogue signal, which is sent back to the DML 209 to control its temperature and lock the laser wavelength.

In FIG. 2, direct modulation is used for electrical to optical conversion. DML 209 may be replaced by external modulation, in which the gapped CAP signal is modulated to a continuous wave (CW) laser via an electro-absorption modulator (EAM) or a Mach-Zehnder modulator (MZM), respectively. In this case, the output of the control unit is sent back to the CW laser to control its temperature and lock the laser wavelength.

In FIG. 2 only a single wavelength is shown, although the configuration can also cover multi-wavelength case. For each channel, a CAP signal with gap is generated in the electrical domain and is intensity modulated onto a lightwave via direct modulation or external modulation. Each modulated light is combined with other channels via a WDM (wavelength division multiplexing) multiplexer, and the multiplexed channels are sent into a single optical filter for unbalanced sidebands generation. The optical filter has periodic transmission and is also used for wavelength locking for multi-channel. A low frequency pilot tone signal is used to dither each transmitter for stabilization as well as for channel identification, in which the frequency is different for each channel. The outputs of the photo-detectors contain those pilot signals, in which each dither is identified and processed in control unit, and then the control signal of each channel is sent back to the corresponding transmitter to control its temperature and lock the wavelength. A time-domain multiplexing (TDM) method may be used to perform wavelength locking of multiple individual lasers of the WDM transmitters.

The optical filter suppresses the undesired optical sideband as well as the optical carrier, where the former is suppressed more significantly. The output of the optical transmitter has two unbalanced optical sidebands separated by gaps, and is sent into optical transmission link 218. The link consists of at least one segment of transmission fiber 220 and may have one or more optical amplifier(s), such as optical amplifiers 219 and 221, to compensate the loss of transmission fiber. The link does not require dispersion compensation fiber for dispersion compensation, since the dispersion will be compensated in the electrical domain. However the link does not exclude the case in which the DCF has already been installed.

The transmitted signal is sent to an optical band-pass filter (OBF) 223 to remove the excess optical noise for single channel case, and for multiple channel case, the OBF would be a demultiplexer. The filtered signal is sent into a photo-detector (PD) 224 for optical to electrical signal conversion under square-law detection. The PD may be a PIN photodiode or an avalanche photodiode (APD). The photo-detection of optical signal with unbalanced sidebands and gaps is expected to retain the full information of the optical field, which will be verified later.

The photo-detected analogue signal is converted to digital signal by an analogue to digital convertor (ADC) 225. The digital signal is separated into two parts, with one fed into the in-phase matching filter 227 and the other sent into the quadrature matching filter 228, to recover the in-phase and quadrature information, respectively. Here the matching filters may have the same impulse response as their corresponding pulse shaping filters. The matching filters maintain the carrier-signal beating term and remove the signal-signal beating induced interference. The carrier-signal beating term retains the full field information of CAP signal. The outputs of matching filters are both down-sampled by one or more down sampling modules 229 and sent in the equalizer 230 for channel equalization. The channel equalization requires the full information of the optical field retained during the photo-detection and matching filtering, and compensates the dispersion effect and any other impairment, like strong optical filtering. The equalizer 230 may be any type of channel equalizers, like linear or nonlinear, sub-optimal or optimal equalizers, and may be adaptive. For large amount of dispersion, the dispersion compensation may be carried out right after the matching filters and before down-sampling, which may be realized in frequency domain. In this case, the equalizer 230 is used to compensate the residual dispersion and other impairments, like optical filtering. The equalized signal is sent into a decoder or demapper 231 to decode the multi-level signal back to binary data train. The output of the signal reconstruction and equalization 226 is data 232.

In the above embodiment, a single gapped CAP is considered, the scheme may also be extended to multi-CAP. In this case, the binary data in FIG. 2 may be a number of tributaries rather than a single serial data or the single serial data may be demultiplexed into a number of tributaries. Each tributary is generated to a CAP signal using the method described above, where each gapped CAP signal has a different subcarrier frequency. These CAPs are multiplexed to generate multi-CAPs, which are D/A converted and used to modulate a lightwave. Some excess bandwidth or space may be needed between adjacent CAPs. In the receiver side, multi-CAPs can be recovered in similar as single CAP. Here the number of CAP is a few, like 4, in which the symbol rate of each CAP is still comparable with or in the order of its subcarrier frequency.

Figure 3:
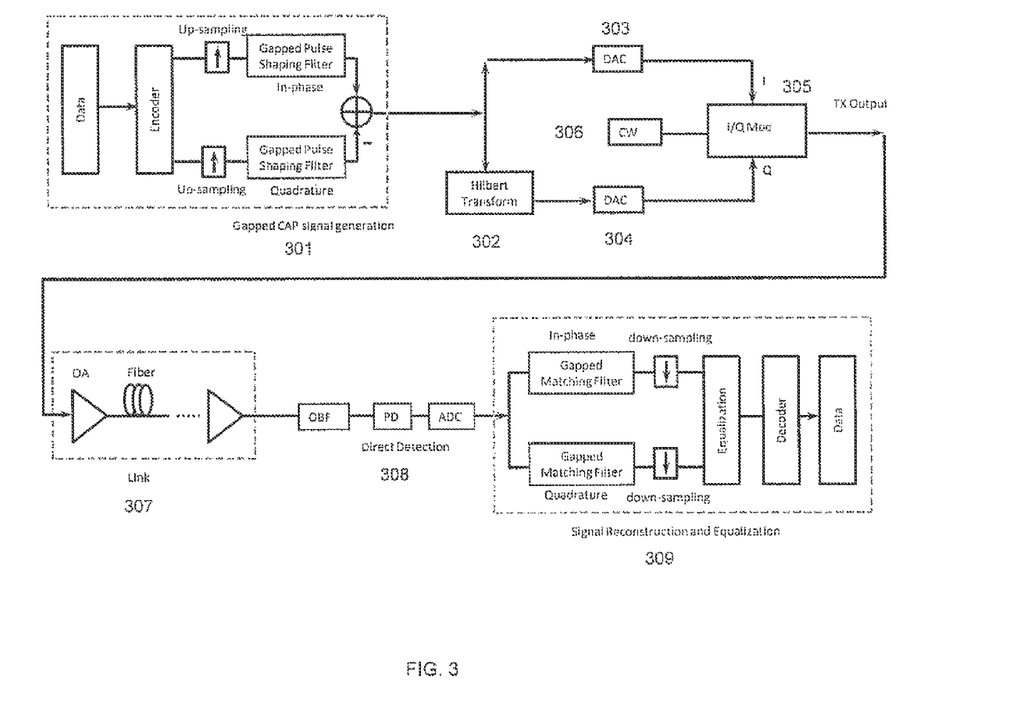
FIG. 3 is a diagram illustrating another exemplary direct detection transmission system based on gapped CAP modulation.

In FIG. 2, the unbalanced sideband generation is based on intensity modulation plus optical filtering. In other embodiments, the unbalanced sideband generation may also be realized using an I/Q modulator as shown in FIG. 3. FIG. 3 shows another embodiment of directly detection system based gapped CAP modulation, wherein the unbalanced optical sidebands are generated by I/Q modulator 309. The method for gapped CAP signal generation in DSP 301 is the same as in FIG. 2. The digitally generated gapped CAP data is separated into two parts with one being Hilbert transformed at transforming module 302. Then the two parts of digital data are sent to two DACs 303 and 304 to generate waveform and form I and Q signals, respectively. Here the Q channel is the Hilbert transform of I channel and they are not independent. I and Q signals drive the I/Q modulator 305 and modulate the CW light 306, where π/2 phase shift is introduced to between the I and Q channels. To generate unbalanced sidebands with carrier, both MZMs for I and Q modulation inside the I/Q modulator 305 should be biased slightly away from the null point. This driving condition would make the carrier has similar power to that of signal sidebands. Using this way, the undesired sideband could be very weak and the output becomes traditional single sideband with optical carrier. The output with unbalanced CAP sidebands and separation gap is sent into an optical link 307, direct detection 308, and signal reconstruction and equalization 309, as discussed above in regard to FIG. 2.

Figure 4:
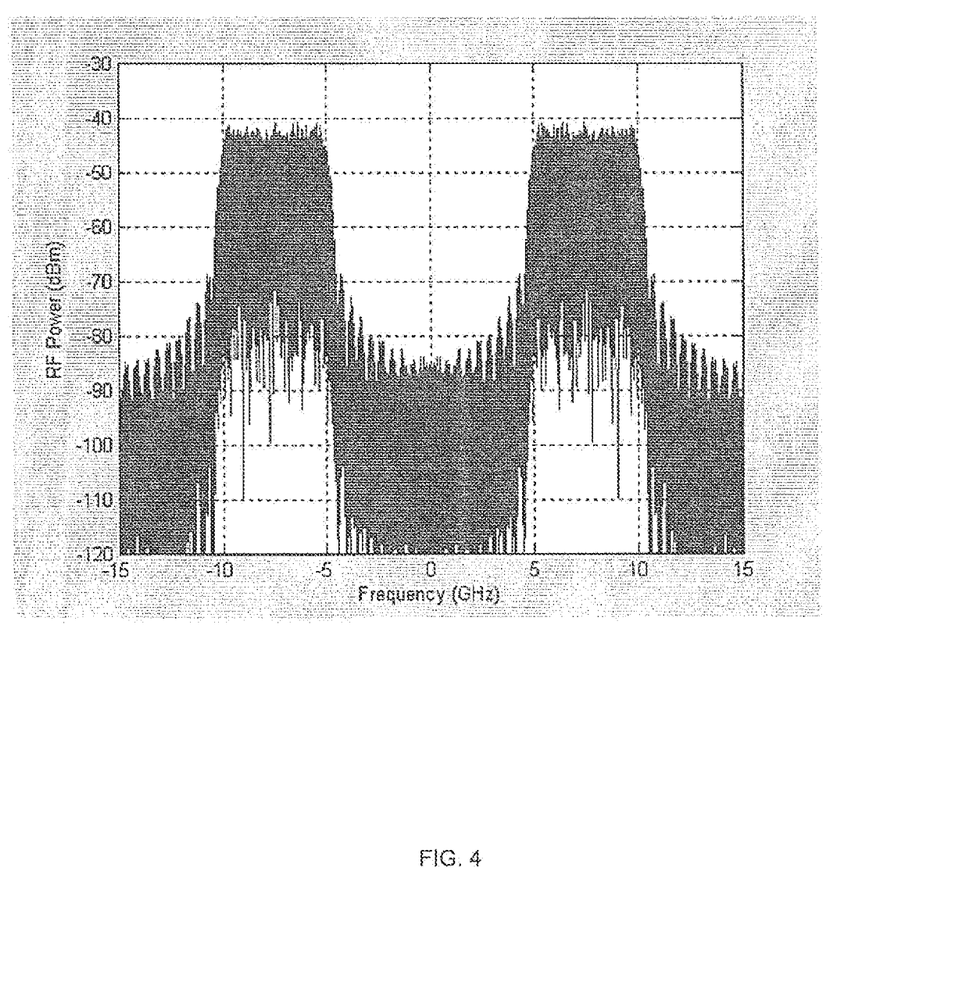
FIG. 4 is a graph illustrating an exemplary electrical spectrum of gapped CAP signal.

A typical electrical spectrum of the generated CAP signal with separation gap is shown in FIG. 4. Since the gapped CAP signal is real value, its spectrum has double sidebands. The gap between the DC component (0 Hz frequency) and the sideband signal is realized by introducing a relatively high subcarrier frequency $f_{sc}$. The spectrum shape of the signal sideband is determined by the type of the shaping filter and roll-off factor. Shaping filters include but not limited to raised-cosine filter and root-square raised-cosine filter.

Figure 5:
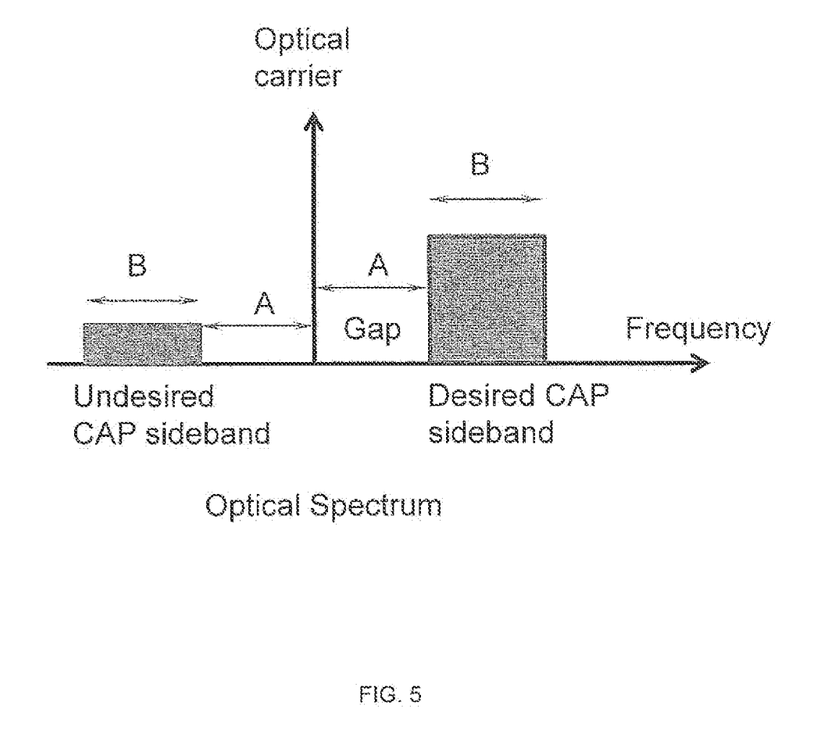
FIG. 5 is a graph illustrating an exemplary optical spectrum of gapped CAP based optical transmitter with unbalanced optical sidebands.

The schematic optical spectrum of optical transmitter output based on gapped CAP modulation is shown in FIG. 5, which has an optical carrier and two unbalanced sidebands separated by gaps. The sideband with higher intensity is called desirable sideband (DS) and the sideband with lower intensity is called undesirable sideband (US). The optical transmitter is characterized by optical carrier to signal power ratio (OCSPR), single sideband suppression ratio (SSSR) and gap width. OCSPR is defined as the optical power ratio of optical carrier to the integrated power over both desired and undesired optical signal sidebands. SSSR is defined as the power ratio of desired sideband to undesired sideband.

For optical signal with two unbalanced optical sidebands, the optical field can be expressed as:

$$E(t)=[E_0+E_1 f_1(t)e^{j\Phi_1(t)}e^{j2\pi f_{sc}t}+E_2 f_2(t)e^{j\Phi_2(t)}e^{-j2\pi f_{sc}t}]e^{j\omega_0 t} \quad (3)$$

where $\omega_0$ is optical carrier angle frequency, $E_0$ is the amplitude of the optical carrier, and $E_1$, $f_1(t)$ and $\Phi_1(t)$ are the amplitude, the normalized amplitude waveform function, and the phase of the of desirable sideband, respectively, while $E_2$, $f_2(t)$ and $\Phi_2(t)$ are the amplitude, the normalized amplitude waveform function, and the phase of the of undesirable sideband, respectively. Here the phase may include the effects of chirping, filtering and dispersion. And we have assumed that the blue sideband is the desirable sideband.

The photo-detection of the optical field gives:

$$|E(t)|^2 = |E_0|^2 + E_1^2|f_1(t)|^2 + E_2^2|f_2(t)|^2 + \quad (4)$$
$$2E_0 E_1 f_1(t)\cos[2\pi f_{sc}t+\Phi_1(t)] + 2E_0 E_2 f_2(t)\cos[2\pi f_{sc}t-\Phi_2(t)] +$$
$$2E_1 E_2 f_1(t)f_2(t)\cos[4\pi f_{sc}t+\Phi_1(t)-\Phi_2(t)]$$

The first term is DC component, the second term is the DS-DS beating induced interference, and third term is the US-US beating induced interference. The first term in the second line is the beating of carrier-DS and the second term in the second line is the beating of carrier-US. The last term is the beating between the desirable and undesirable sidebands.

Figure 6:
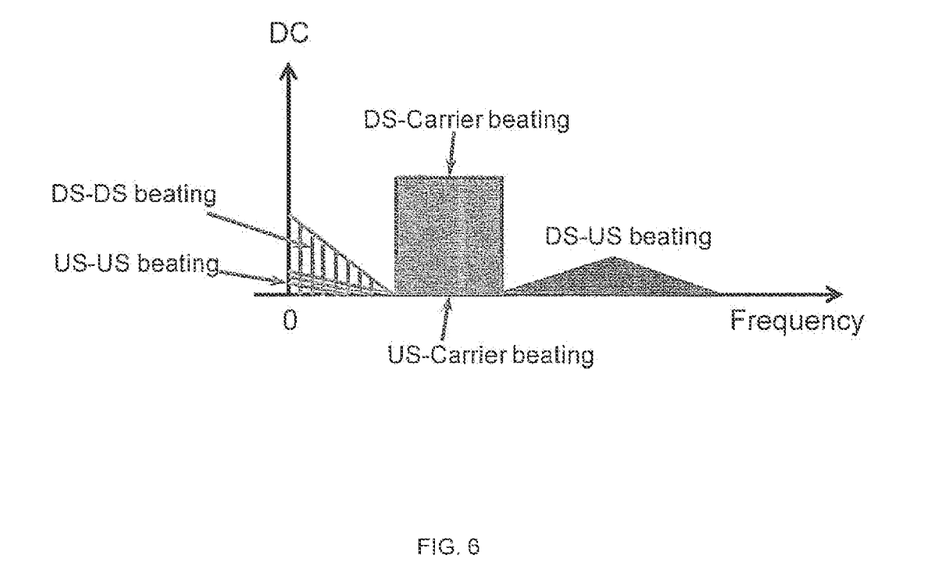
FIG. 6 is a graph illustrating an exemplary electrical spectrum of photo-detected optical signal with gapped unbalanced optical sidebands where only positive frequencies are shown.

The schematic electrical spectrum of photo-detected optical signal with gapped unbalanced optical sidebands is shown in FIG. 6. The beating between the desirable and undesirable sidebands is higher order terms and is located above the signal band, and can be separated from signal. The DS-DS and US-US beating induced interference is mostly located in gap. If the gap is close to or larger than the signal band, this interference can be separated from the carrier-signal beating and totally eliminated.

For the case of back-to-back (BtB) without strong optical filtering, most likely $\Phi_1(t)=-\Phi_2(t)=\Phi(t)$, and f1(t)=f2(t)=f(t). After eliminating the interference induced from DS-DS, US-US and DS-US beating, the photo-detected signal can be expressed as:

$$|E(t)|^2=2E_0(E_1+E_2)f(t)\cos [2\pi f_{sc}t+\Phi(t)] \quad (5)$$

Equ. (5) shows that the undesirable term constructively contributes to the detected signal and improves the SNR performance.

With link transmission, the fiber chromatic dispersion introduces different phase shift at different frequency components and $\Phi_1(t)-z\neq -\Phi_2(t)$, $f_1(t)\neq f_2(t)$. The contribution of undesirable sideband depends on the single sideband suppression ratio, symbol rate, gap width and dispersion amount, but is not necessary that the performance is linearly degraded with the increase of dispersion, particularly when the optical signal is chirped, like from DML. For practical application, it is desirable that the SSSR is as large as possible to minimize the variation of performance on fiber dispersion. Basically the undesired sideband may induce dispersion penalty, while when SSSR is larger than 20 dB, the dispersion induced OSNR penalty arising from the undesirable sideband is very small and negligible. In this case, the photo-detected signal can be expressed as:

$$|E(t)|^2=2E_0 E_1 f_1(t)\cos [2\pi f_{sc}t+\Phi_1(t)] \quad (6)$$

Equ. (6) shows that after photo-detection, both amplitude and phase information of optical field are fully retained. The direct detection system disclosed herein introduces a gap between carrier and sideband, which is used to accommodate signal-signal beating induced interference and separate it from useful signal-carrier beating. Therefore there is no limitation on the OCSPR, which can be obtained at its optimal value where optical carrier has similar to power to that of signal sideband, and the ROSNR significantly improves.

This is different from SSB based on baseband modulation, where signal-signal beating induced interference is overlapped in spectrum with that of carrier-signal beating and cannot be eliminated, and very large optical carrier to signal power ratio to relieve the interference is required. This leads to poor ROSNR.

Also different from subcarrier multiplexed system and optical OFDM system with single sideband, where large number of subcarriers are used and the dispersion effect on data carried over each subcarrier is negligible. Our proposed direct detection system uses a single subcarrier where the symbol rate of the data carried over the subcarrier is comparable to the subcarrier frequency and dispersion effect arising from signal sideband itself is not negligible. Dispersion compensation is carried out in the electrical domain which uses the full information of optical field retained during photo-detection. According to some embodiments, multiple CAPs are used, while the symbol rate of each CAP is still comparable to its subcarrier frequency.

Next we would verify that direct detection of CAP signal with unbalanced optical sidebands separated by gap retains the full information of optical field, and dispersion compensation can be realized in the electrical domain. We consider the unbalanced sideband generation of CAP signal using an I/Q modulator, as shown in FIG. 3. A square-root raised-cosine Nyquist filter with roll-off factor of 0.15 is used as CAP pulse shaping filter and a gap is introduced between the DC and CAP signal by properly setting the subcarrier frequency of CAP filter. 12.5 Gbaud/s symbol rate and CAP-16 format are used, generating a data rate of 50 Gb/s, which may consists of 40 Gb/s payload and 25% overhead for FEC and DSP. Here we set the subcarrier frequency to be 1.5 times of the symbol, which generates a gap width around 12.5 GHz, the symbol rate. The optical demultiplexer used to remove excess optical noise has a 3 dB bandwidth of 30 GHz. The link considered is 8 spans of single mode fiber, with span spacing of 80 km. Each span is optically amplified to compensate the fiber loss, and dispersion compensation fiber is not used. The photo-detector used to directly detect the CAP signal is a PIN photo diode detector, and the matching filters used to recover the in-phase and quadrature information are the same as corresponding pulse shaping filters. Dispersion compensation is carried right after the matching filters in frequency domain. The equalizer is used to compensate any residual impairment that may present.

Figure 7:
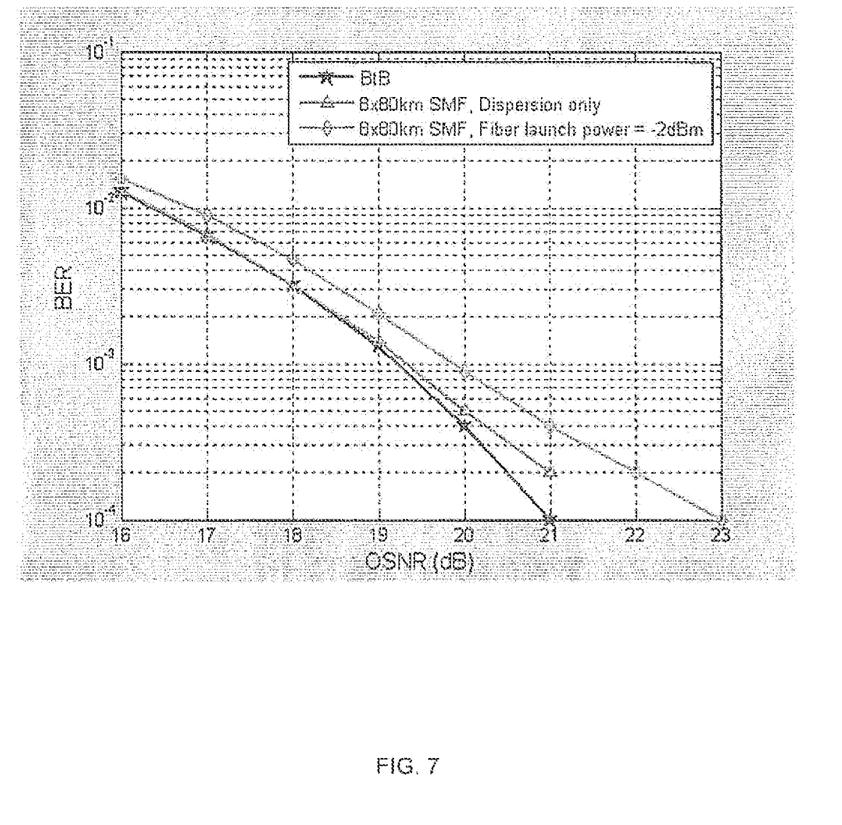
FIG. 7 is a graph illustrating an exemplary simulation of gapped CAP based direct detection system with dispersion compensation in the electrical domain.

FIG. 7 shows the simulation results with bit error rate versus ONSR under different scenarios. When there is no fiber nonlinearity, the ROSNR after 8×80 km transmission is almost the same as that of back-to-back case. This shows that the dispersion is well compensated in the electrical domain and the penalty is negligible. Once fiber nonlinearity is included with fiber launch power of −2 dBm, a penalty around 0.6 dB is observed due to fiber nonlinear effect at BER of 1e-3.

What is claimed is:

1. A method of generating a gapped carrierless amplitude-phase modulated (CAP) signal, comprising:
    encoding a set of binary data into multi-level formatted data comprising an in-phase sequence and quadrature sequence;
    introducing a gap between a direct component and the in-phase sequence of the multi-level data format using a gapped in-phase pulse shaping filter to generate a gapped in-phase pulse signal;
    introducing a gap between a direct component and the quadrature sequence of the multi-level data format using a gapped quadrature pulse shaping filter to generate a gapped quadrature pulse signal; and
    generating a gapped CAP signal based on the difference between the gapped in-phase pulse signal and the gapped quadrature pulse signal.

2. The method of claim 1, wherein the encoding further comprises I/Q separating a set of binary data.

3. The method of claim 1, further comprising up-sampling the multi-level formatted data.

4. The method of claim 1, further comprising:
    generating additional CAP signals; and
    multiplexing two or more CAP signals to generate a multi-CAP signal.

5. A method of recovering binary data from an optical signal, comprising:
    performing electrical signal conversion on an optical signal at a photo detector to generate a photo-detected analogue signal;
    converting the photo-detected analogue signal to a digital signal, the digital signal comprising an in-phase sequence and a quadrature sequence;
    recovering in-phase information from the in-phase sequence using a gapped in-phase matching filter such that a carrier-signal beating term is retained and any signal-signal beating induced interference is removed;
    recovering quadrature information from the quadrature sequence using a gapped quadrature matching filter such that a carrier-signal beating term is retained and any signal-signal beating induced interference is removed;
    performing channel equalization on the in-phase and quadrature information, wherein converting the photo-detected analogue signal to a digital signal retains full field information of the optical signal and the channel equalization compensates for a residual dispersion effect in the electrical domain using the retained full field information; and
    decoding the in-phase and quadrature information into binary data.

6. The method of claim 5, further comprising down sampling the in-phase and quadrature information.

7. The method of claim 5, further comprising removing optical noise from the optical signal at an optical band-pass filter.

8. The method of claim 5, wherein the electrical signal conversion uses square-law detection.

9. An apparatus for performing directly detected optical transmission based on carrierless amplitude-phase modulation (CAP), comprising:
    an input module configured to receive and encode binary data;
    a filtering module coupled to the input module configured to generate a gapped CAP signal from the encoded binary data;
    a digital to analogue converter coupled to the filtering module configured to convert the gapped CAP signal to a digital signal;
    a driver module coupled to the digital to analogue convertor configured to amplify the analogue driving signal;
    a laser coupled to the driver module configured to receive the analogue driving signal and output an optical signal based on the analogue driving signal;
    an optical filter coupled to the laser configured to receive the optical signal, generate two unbalanced optical sidebands separated by a gap, and lock the wavelength of the optical signal;
    an optical link coupled to the optical filter configured to transport the optical signal from the optical filter to direct detection module;
    a direct detection module coupled to the optical link configured to remove optical noise from the optical signal, perform photo-detection on the optical signal to generate an analogue signal, and convert the analogue signal to a digital signal, wherein the direct detection module retains full optical field information; and a data reconstruction module coupled to the direct detection module configured to:
  separate the digital signal into an in-phase signal and a quadrature signal;
  filter the in-phase signal through an in-phase matching filter to recover in-phase information;
  filter the quadrature signal through a quadrature matching filter to recover quadrature information;
  perform channel equalization on the in-phase and quadrature information; and
  decode the in-phase and quadrature information into binary data;
wherein the matching filters maintain a carrier-signal beating term and remove signal-signal beating induced interference, and wherein the channel equalization compensates for a residual dispersion effect in the electrical domain using the retained full optical field information.

10. The apparatus of claim 9, wherein the laser is driven using direct modulation.

11. The apparatus of claim 9, wherein the laser is driven using external modulation.

12. The apparatus of claim 9, wherein the optical link comprises one or more segments of optical transmission fiber and one or more optical amplifiers.

13. The apparatus of claim 9, wherein the optical band-pass filter is a demultiplexer.

14. The apparatus of claim 9, wherein the photo-detection retains full field information of the optical signal.

15. The apparatus of claim 9, wherein the channel equalization compensates for signal impairment.

16. The apparatus of claim 14, wherein the channel equalization is performed using the full field information retained during photo-detection.

17. The apparatus of claim 14, wherein the channel equalization is performed in the electrical domain.

18. The apparatus of claim 9, wherein the direct detection module uses a single subcarrier.

* * * * *